United States Patent [19]

Sotokazu

[11] 4,383,550
[45] May 17, 1983

[54] CONSTANT FLOW VALVE

[76] Inventor: Rikuta Sotokazu, 24-7, 2-chome, Koun-cho, Maebashi-shi, Gunma-ken, Japan, 371

[21] Appl. No.: 316,472

[22] Filed: Oct. 30, 1981

[30] Foreign Application Priority Data

Nov. 26, 1980 [JP] Japan ................... 55-166016

[51] Int. Cl.³ ...................... F16K 21/02; F15D 1/04
[52] U.S. Cl. ...................... 137/517; 138/45; 138/46
[58] Field of Search .............. 137/517, 497; 138/45, 138/46

[56] References Cited

U.S. PATENT DOCUMENTS

| | | | |
|---|---|---|---|
| 1,944,088 | 1/1934 | Linderoth | 137/517 |
| 2,928,414 | 3/1960 | Streeter | 137/517 |
| 2,956,583 | 10/1960 | Streeter | 137/517 |
| 3,763,884 | 10/1973 | Grassi et al. | 137/517 |
| 4,009,826 | 3/1977 | Walker | 137/517 |
| 4,306,585 | 12/1981 | Manos | 137/517 |

Primary Examiner—Martin P. Schwadron
Assistant Examiner—John A. Rivell
Attorney, Agent, or Firm—Jordan and Hamburg

[57] ABSTRACT

A constant flow valve provides a predetermined uniform flow rate at the downstream side even when changes in pressure differential occur between the upstream and downstream sides, the constant flow rate being obtained by providing a contoured profile on the flow restrictor in the valve according to defined parameters.

3 Claims, 4 Drawing Figures

CONSTANT FLOW VALVE

BACKGROUND OF THE INVENTION

The present invention relates to a constant flow valve which provides a predetermined uniform flow rate at the secondary side even when changes in pressure differential occur between the primary and secondary sides.

A conventional constant flow valve, such as disclosed in U.S. Pat. No. 3,837,362 is characterized in that changes in the pressure of a fluid flowing into a conduit or a pipe cause a conical head to move against the force of a spring, which results in the automatic control of the effective orifice area between the conical head and the inner surface's contour of a flow restrictor to maintain constant the flow rate on the secondary side. However, the inner surface of the flow restrictor, according to the aforementioned U.S. patent, is expressed only as a contoured passageway or contoured profile and no technical clarification on the contour itself, which is most important to the control of the flow rate, has been disclosed therein. Therefore, constant flow valves according to the above U.S. patent can be conceived as only maintaining the flow rate approximately constant when changes in the pressure of a fluid flowing into the valves occur, and such valves cannot be expected to maintain the flow rate accurately constant.

Accordingly, an object of the present invention is to overcome the disadvantages of such prior art valves and provide a constant flow valve which maintains the flow rate on the secondary side accurately constant even when changes in the pressure differential between the primary and secondary sides occur, such being achieved by providing a contoured profile on the inner surface of the flow restrictor.

Other features which are considered characteristic of the invention are set forth in the appended claims.

Although the invention is illustrated and described in relationship to specific embodiments, it is nevertheless not intended to be limited to the details shown, since various modifications and structural changes may be made therein without departing from the spirit of the invention and within the scope and range of equivalents of the claims.

The construction and operation of the invention, however, together with additional objects and advantages thereof will be best understood from the following description of specific embodiments when read in connection with the accompanying drawings.

DESCRIPTION OF THE PREFERRED EMBODIMENTS

Figure 1:
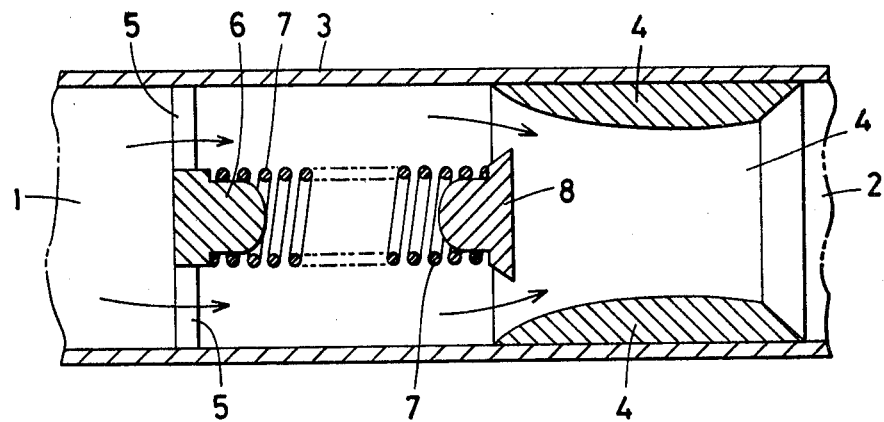
FIG. 1 is a longitudinal sectional view showing the construction and principle of operation of the invention.

Referring to FIG. 1 of the accompanying drawings, a tubular restrictor 4 is fixed on the downstream side in a tubular conduit fitting 3 having a fluid inlet 1 and a fluid outlet 2. A spring retainer 6 is fixed to a frame member 5 which is fixed on the upstream side in the fitting 3. A conical inner valve 8 is mounted along the horizontal centerline of the spring retainer 6 by means of a coil spring 7.

When a fluid under pressure flows into the fitting 3, the fluid flow is restricted at the annular opening between the inner valve 8 and the flow restrictor 4 to create a differential pressure across the opening. Consequently, the inner valve 8 is given pressure, and thereby moves towards the right (as viewed in FIG. 1) against the force of the spring 7 until the required area of the opening (effective orifice area) is formed between the inner valve 8 and the flow restrictor 4 to allow the differential pressure at the opening to just balance the force of the spring 7. When a fluid having a higher or lower pressure flows into the fitting 3, the inner valve 8 advances towards the right or retracts towards the left until the inner valve 8 forms the required area of the opening (effective orifice area) with the flow restrictor 4 to allow equilibrium to be established.

Figure 2:
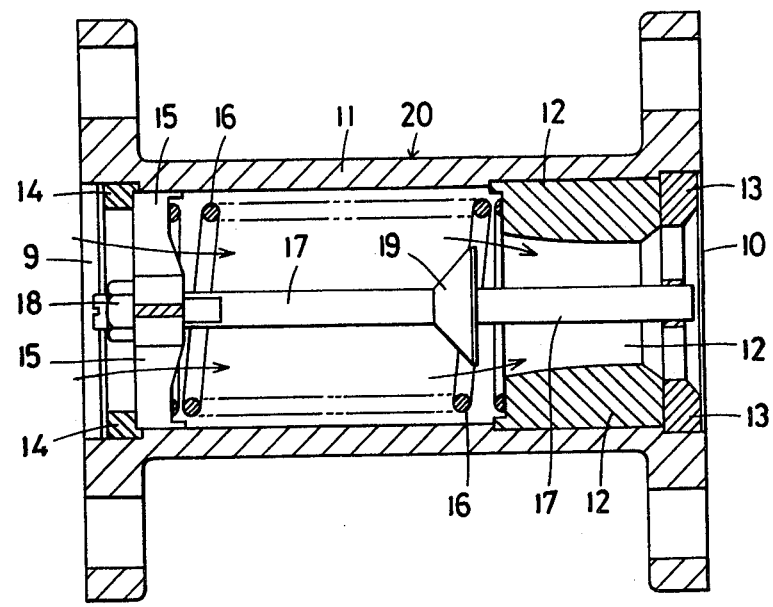
FIG. 2 is a longitudinal sectional view of one embodiment according to the invention.

In one practical embodiment of the invention illustrated in FIG. 2, a tubular flow restrictor 12 is fixed near a fluid outlet 10 in a tubular conduit fitting 11 by means of a stopper 13. A stopper 14 is fixed near a fluid inlet 9 in the fitting 11, and a frame-like spring retainer 15 is movably therein in such a way that the range of the movement of the spring retainer 15 towards the left is limited to the position of the stopper 14. A coil spring 16 is placed between the spring retainer 15 and the flow restrictor 12. A valve stem 17 is mounted along the horizontal centerline of the coil spring 16 so that one end of the valve stem 17 is attached to the spring retainer 15 by means of a nut 18 while the other end is movably held by means of the stopper 13 on the outlet side. A conical inner valve 19 is coaxially attached to the valve stem 17 at the middle thereof.

In a constant flow valve 20 thus constructed, when fluid flows thereinto through the inlet 9, the desired area of the opening (effective orifice area) is formed between the inner valve 19 and the flow restrictor 12 in a similar manner as above to allow the differential pressure at the opening to just balance the force of the spring 16; namely, when fluid having a higher pressure flows into the constant flow valve 20, compressing the spring 16 as a result of the action of the fluid on the inner valve 19, the inner valve 19 thus moves towards the right (as viewed in FIG. 2), together with the valve stem 17, to reduce the orifice area. As described above, the inner valve 19 moves horizontally, together with the valve stem 17, in proportion to fluid pressure, thus slidng the spring retainer 15 in the fitting 11 to compress or tension the spring 16 while constraining the spring 16 between the spring retainer 15 and the flow restrictor 12.

Referring once again to FIG. 1, a conical inner valve 8 will be described in detail with respect to the working principle thereof. A fluid which has passed through the fluid inlet 1 into the tubular conduit fitting 3 is restricted at the opening between the conical inner valve 8 and the tubular flow restrictor 4, so that a differential pressure is created across the opening. In this case, the following equation holds:

$$Q = \alpha F \sqrt{\frac{2g(p_1 - p_2)}{\gamma}} \tag{1}$$

where

Q=flow rate.
α=coefficient of discharge
F=effective orifice area.
g=acceleration due to gravity.
$p_1$=pressure on upstream side of orifice.
$p_2$=pressure on downstream side of orifice.
γ=specific gravity of fluid.

If the spring constant of the spring 7, the displacement thereof, and the area of the pressure-receiving portion of the inner valve 8 are taken respectively to be k, L and A, then the following equation holds:

$$(p_1-p_2)A = kL. \tag{2}$$

From equations 1 and 2, $$Q = \alpha F \sqrt{\frac{2gkL}{\gamma A}}. \tag{3}$$

All of α, g, k, and γ are constants in the above equation 3. Therefore, if $$\alpha \sqrt{\frac{2gk}{\gamma A}} = K, \tag{4}$$

then equation 3 appears as $$Q = KF\sqrt{L}. \tag{5}$$

Namely, the flow rate is directly proportional to the effective area of flow through the restrictor or the orifice area and to the square root of the displacement of the spring.

Figure 3:
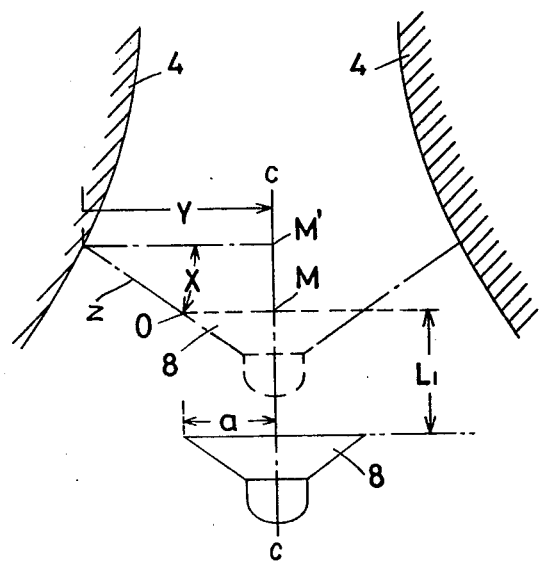
FIG. 3 is an enlarged detail of a portion of FIG. 1.

Next, a way is explained to obtain the contoured profile of the inner surface of the flow restrictor 4. In FIG. 3 which is an enlarged detail of a portion of FIG. 1, if the displacement of the conical inner valve 8, the required effective area of a fluid flow through the flow restrictor 4 or the required orifice area, and a definite rate of fluid flow through the restrictor 4 are taken respectively to be $L_1$, $F_1$, and Qa at the time when the inner valve 8 is brought into the position bounded by the dashed lines shown in FIG. 3, then the following equation holds:

$$Qa = KF_1\sqrt{L_1}. \quad \text{Therefore} \tag{6}$$

$$F_1 = \frac{Qa}{K\sqrt{L_1}}. \tag{6'}$$

The required effective area of fluid flow through the flow restrictor 4 or the required orifice area $F_1$ constitutes the lateral area of a truncated cone formed between the conical inner valve 8 and the flow restrictor 4.

Figure 4:
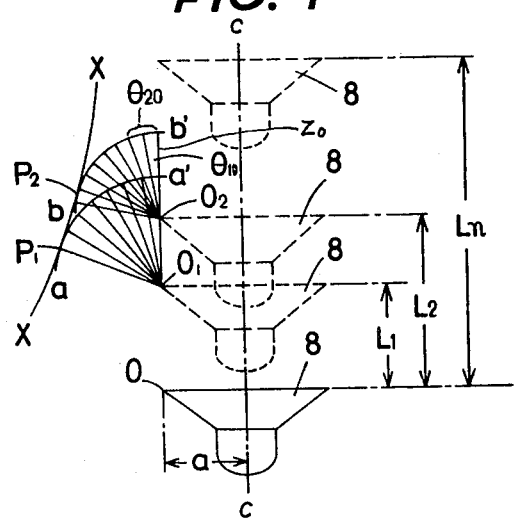
FIG. 4 is an explanation drawing for forming the curved line X—X, namely the generatrix of the inner surface of a flow restrictor according to the invention.

If the elements of the geometry are given characters as shown in FIGS. 3 and 4, then the following equations hold:

$$y = a + x \tan\Theta. \tag{7}$$

$$F_1 = \pi(y + a)\sqrt{(y-a)^2 + x^2}. \tag{8}$$

Rearrangement by substituting Equation 7 into Equation 8 yields $$x^2 \tan\theta + 2ax - \frac{F_1}{\pi\sqrt{\tan^2\theta + 1}} = 0.$$

Since x are positive numbers, the following equation is obtained:

$$x = \frac{-a + \sqrt{a^2 + \frac{F_1 \tan\theta}{\pi\sqrt{\tan^2\theta + 1}}}}{\tan\theta} \tag{9}$$

Here a is known and $F_1$ is also known from Equation 6'. Therefore, substituting the Θ-values 10°, 20°, 30°, ..., 90° into Equation 9 yield the respective x-values, and substituting these resulting x-values into Equation 7 gives the respective y-values. Since $x^2+(y-a)^2=z^2$, the line segment z can be determined.

As shown in FIG. 4, a smooth curve a-a' is formed by:

(a) drawing the line segments z's ($z=z_1, z_2, z_3, \ldots, z_n$) so that one end of each of them is located at the extreme upper left-hand end (the point $0_1$) of the conical inner valve 8, such line segments z's making respective angles Θ's (Θ=10°, 20°, 30°, ..., 90°) with the vertical line drawn through the point $0_1$, such line segments z's corresponding in length, that is, in value as regards their respective angles Θ's; and (b) connecting the other ends of the line segments z's.

If the displacement of the conical inner valve 8 and the required orifice area are taken respectively to be $L_2$ and $F_2$ at the time when the inner valve 8 moves into the second dashed-line position (shown in FIG. 4) from below, then the following equation holds:

$$F_2 = \frac{Qa}{K\sqrt{L_2}}. \tag{10}$$

A smooth curve b-b' connecting the other ends of a plurality of line segments (z')'s ($z'=z_1', z_2', z_3', \ldots, z_n'$) is obtained as before. Thus a plurality of the above-mentioned smooth curves (a-a', b-b', c-c', ... n-n') are obtained by repeating this procedure many times.

A curved line X—X which osculates with a plurality of the smooth curves (a-a', b-b', c-c', ... n-n') obtained in the way described above is the desired curved line itself, that is, the desired generatrix or the desired surface element. For example, if the points at which the curved line X—X osculates with a plurality of the smooth curves (a-a', b-b', ..., n-n') are taken respectively to be $P_1, P_2, P_3, \ldots, P_n$, then these points satisfy the condition of the required minimum lateral areas of truncated cones formed between the flow restrictor 4 and the conical inner valve 8 in the respective positions thereof. It is apparent that the line segments $O_1P_1$, $O_2P_2$, $O_3P_3$, ... $O_nP_n$ constitute the respective generatrices of the curved surfaces of the truncated cones which are formed between the restrictor 4 and the inner valve 8 in the various positions thereof and whose lateral areas are the effective orifice areas $F_1, F_2, F_3, \ldots$, $F_n$ described previously; namely, the effective areas of flow through the restrictor. Consequently, it is sufficient to fabricate a flow restrictor whose inner surface has as its generatrix the curved line X—X.

Next, as an important advantage of this invention, there is explained the fact that a constant flow valve according to the invention may be used to maintain a different flow rate constant by not changing the above-mentioned restrictor but replacing only the coil spring with a new one of a different spring constant. For example, it can be seen from Equation 6' that when the spring constant is increased by a factor of four, then $F_1$ does not change if the flow rate is increased by a factor of two. In this case, since there are no changes or alterations in a, and also the other elements of the formation of the curved line X—X, the same restrictor as that described in the practical embodiment of the present invention can be used. That is to say, the combined use of one of the restrictors of high, medium and low flow rates and one of the coil springs of different spring constants enables the constant flow valve to be used over an extremely wide range of flow rates.

As having been described, the present invention can provide economically a highly efficient constant flow valve which maintains an exactly constant flow of fluid on the secondary side even when changes in pressure differential between the primary and secondary pressures occur.

What I claim is:

1. A constant flow valve comprising a tubular conduit fitting having a tubular flow restrictor fixed within said tubular conduit fitting, said flow restrictor having an inner surface which has as the generatrix thereof a curved line X—X, an inner valve mounted within said conduit fitting opposite to said flow restrictor by means of a spring, one end of said spring being held within said conduit fitting, said curved line X—X osculating with a plurality of curves, each of which is formed by:

(a) applying equations in each of the positions which said inner valve holds when a plurality of the displacements thereof are $L_n$'s, the equations being:

$$x = \frac{-a + \sqrt{a^2 + \frac{F_n \tan\theta_n}{\pi\sqrt{\tan^2\theta_n + 1}}}}{\tan\theta_n}, \quad (1)$$

$$F_n = \frac{K\sqrt{L_n}}{Qa}\left(K = a\sqrt{\frac{2gk}{\gamma A}}\right), \quad (2)$$

$$y = a + x \tan\theta_n \quad (3)$$

and $$z^2 = x^2 + (y-a)^2 \quad (4),$$

where
   a = the radius of the flat portion of the inner valve,
   $F_n$ = the required orifice area which constitutes the effective area of fluid flow through the restrictor,
   α = the coefficient of discharge,
   g = the acceleration due to gravity,
   k = the spring constant,
   A = the pressure-receiving area,
   γ = the specific gravity of fluid,
   z = the line segment ($z_{0°} \sim z_{90°}$) which constitutes the generatrix of the lateral surface of the required truncated cone, and
   $\theta_n$ = the angle (0° ~ 90°) between the line segment and the axis of the constant flow valve;

(b) drawing the line segments z's ($z_{0°} \sim z_{90°}$) on a plane passing through the axis of said constant flow valve so that one end of each of the line segments z's is located at one of two points of intersection of the plane and the downstream edge of said inner valve, and the line segments z's make their respective angles $\theta_n$'s (0° ~ 90°) with the axis of said constant flow valve and correspond in length to their respective angles $\theta_n$'s; and (c) connecting the other ends of said line segments z's.

2. A method of accurately providing a uniform flow rate at the downstream side of a flow control valve when changes in pressure differential occur between the upstream and downstream sides of the control valve, said control valve being of the type having a fixed, tubular flow restrictor operable in conjunction with a movably biased valve member, comprising shaping said fixed flow restrictor with a surface which has as the generatrix thereof a curved line X—X, said curved line X—X osculating with a plurality of curves each of which is formed by:

$$x = \frac{-a + \sqrt{a^2 + \frac{F_n \tan\theta_n}{\pi\sqrt{\tan^2\theta_n + 1}}}}{\tan\theta_n}, \quad (1)$$

$$F_n = \frac{Qa}{K\sqrt{L_n}}\left(K = a\sqrt{\frac{2gk}{\gamma A}}\right), \quad (2)$$

$$y = a + x \tan\theta_n \quad (3)$$

and $$z^2 = x^2 + (y-a)^2 \quad (4),$$

where
   a = the radius of the flat portion of the inner valve,
   $F_n$ = the required orifice area which constitutes the effective area of fluid flow through the restrictor,
   α = the coefficient of discharge,
   g = the acceleration due to gravity,
   k = the spring constant,
   A = the pressure-receiving area,
   γ = the specific gravity of fluid,
   z = the line segment ($z_{0°} \sim z_{90°}$) which constitutes the generatrix of the lateral surface of the required truncated cone, and
   $\theta_n$ = the angle (0° ~ 90°) between the line segment and the axis of the constant flow valve;

(b) drawing the line segments z's ($z_{0°} \sim z_{90°}$) on a plane passing through the axis of said constant flow valve so that one end of each of the line segments z's is located at one of two points of intersection of the plane and the downstream edge of said inner valve, and the line segments z's make their respective angles $\theta_n$'s (0° ~ 90°) with the axis of said constant flow valve and correspond in length to their respective angles $\theta_n$'s; and (c) connecting the other ends of said line segments z's.

3. A method according to claim 2 wherein said movable valve member is biased by a spring, and further comprising controlling different flow rates with said flow control valve by utilizing various springs having different spring constants with the same flow restrictor, whereby accurate uniform flow rates are continuously maintained through said flow control valve when using said various springs.

* * * * *